US006692018B2

(12) United States Patent  (10) Patent No.: US 6,692,018 B2
Jenkins et al.  (45) Date of Patent: Feb. 17, 2004

(54) DUAL SEAM AIR BAG MODULE COVER AND METHOD

(75) Inventors: Jeffrey A. Jenkins, Shelby Township, MI (US); Kurt F. Fischer, Oxford, MI (US)

(73) Assignee: TRW Vehicle Safety Systems Inc., Lyndhurst, OH (US)

( * ) Notice: Subject to any disclaimer, the term of this patent is extended or adjusted under 35 U.S.C. 154(b) by 0 days.

(21) Appl. No.: 09/862,252

(22) Filed: May 22, 2001

(65) Prior Publication Data

US 2002/0175501 A1 Nov. 28, 2002

(51) Int. Cl.[7] ............................................. B60R 21/20
(52) U.S. Cl. ................................. 280/728.3; 280/730.1
(58) Field of Search ............................. 280/728.3, 731, 280/732, 730.1

(56) References Cited

U.S. PATENT DOCUMENTS

| | | | |
|---|---|---|---|
| 3,582,107 A | | 6/1971 | Goetz et al. |
| 3,794,349 A | | 2/1974 | Fuller |
| 4,148,503 A | * | 4/1979 | Shiratori et al. ......... 280/728.3 |
| 5,211,421 A | | 5/1993 | Catron et al. |
| 5,322,324 A | | 6/1994 | Hansen et al. |
| 5,375,876 A | | 12/1994 | Bauer et al. |
| 5,527,065 A | | 6/1996 | Saberan et al. |
| 5,531,476 A | | 7/1996 | Kerner |
| 5,533,748 A | | 7/1996 | Wirt et al. |
| 5,588,674 A | | 12/1996 | Yoshimura et al. |
| 5,829,778 A | | 11/1998 | Woolley et al. |
| 5,975,562 A | * | 11/1999 | Yamamoto et al. ...... 280/728.3 |
| 6,164,685 A | | 12/2000 | Fischer et al. |

FOREIGN PATENT DOCUMENTS

| | | | | |
|---|---|---|---|---|
| DE | 19742506 A1 | | 4/1999 | |
| DE | 20009378 U1 | | 11/2000 | |
| JP | 1-122754 | * | 5/1989 | ............. 280/728.3 |
| JP | 4-110251 | | 4/1992 | |

* cited by examiner

Primary Examiner—Peter C. English
(74) Attorney, Agent, or Firm—Tarolli, Sundheim, Covell & Tummino L.L.P.

(57) ABSTRACT

An apparatus (10) includes an inflatable vehicle occupant protection device (20), an inflator (30), and a cover (40). The inflator (30) inflates the protection device (20). The cover (40) includes a center section (155) interposed between first and second side sections (151, 152). The cover (40) has a strong tear seam (170) and a weak tear seam (160). The weak tear seam (160) releases when subjected to a first force by the protection device (20). The strong tear seam (170) releases after the weak tear seam (160) releases. The protection device (20), while being inflated, releases the weak tear seam (160) and moves at least one of the side sections (151, 152) away from the center section (155). The protection device (20) deploys through a first area provided by moving the side section (151, 152). The protection device (20) urges a vehicle occupant (15) away from the center section (155). Thereafter, the strong tear seam (170) releases, and the protection device (20) moves the center section (155) away from the first area. The protection device (20) then deploys through a second area provided by moving the center section (155).

26 Claims, 3 Drawing Sheets

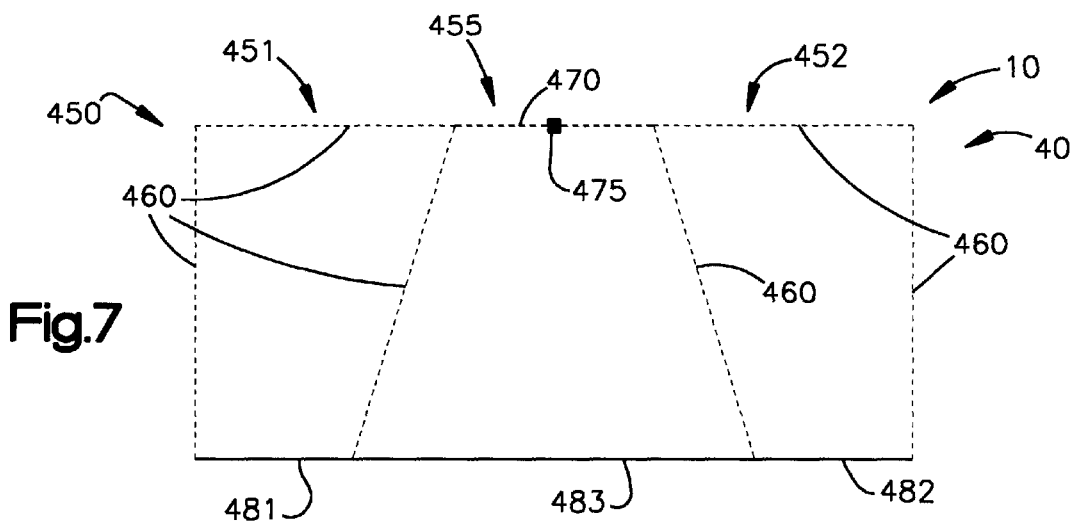
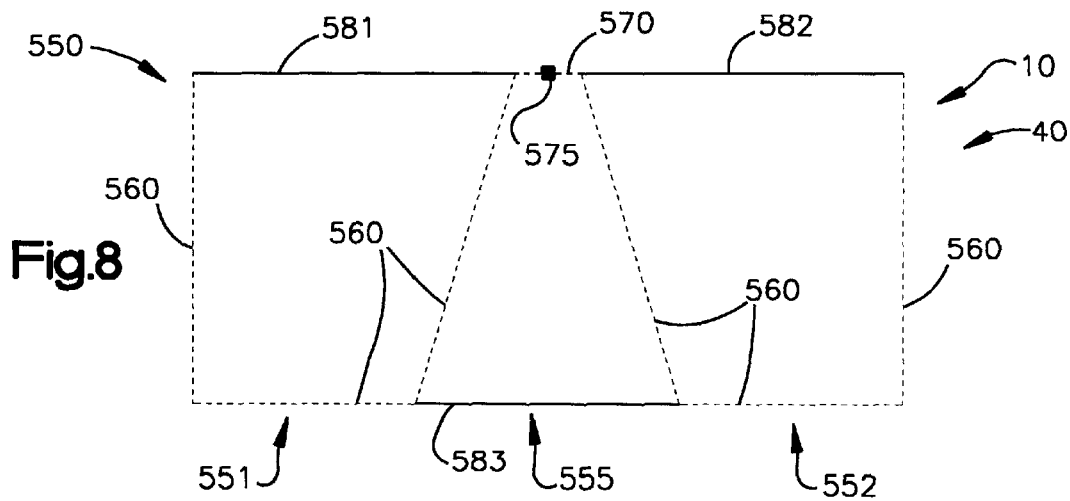
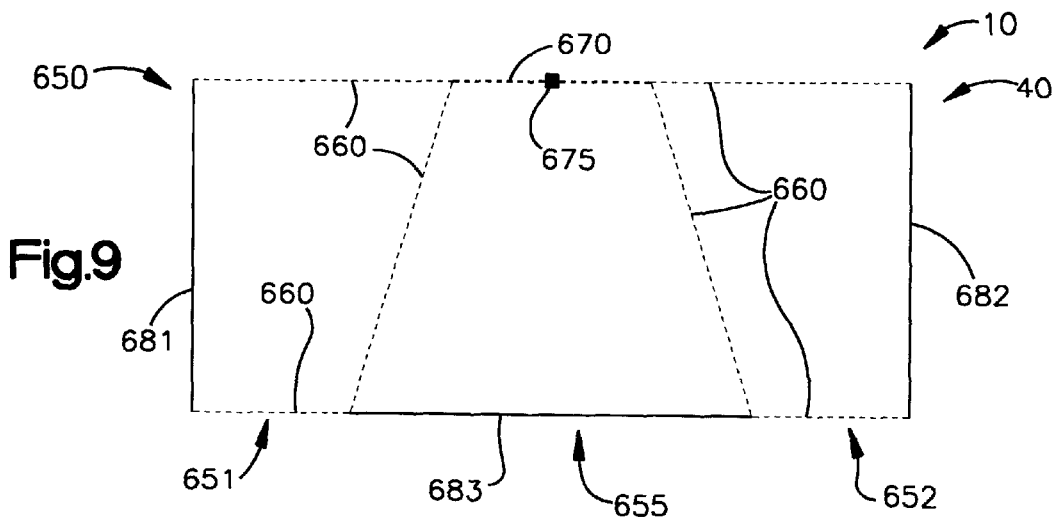

DUAL SEAM AIR BAG MODULE COVER AND METHOD

TECHNICAL FIELD

The present invention relates to an apparatus and a method for helping to protect a vehicle occupant during a vehicle collision.

BACKGROUND OF THE INVENTION

A known apparatus for helping to protect a vehicle occupant, as disclosed in the Japanese patent application to Imai, No. 4-110251(A), includes an inflatable vehicle occupant protection device. The apparatus also includes an inflator for providing inflation fluid to inflate the inflatable vehicle occupant protection device. A cover for the apparatus has a set of tear seams and a separate single tear seam that release upon inflation of the inflatable vehicle occupant protection device.

In operation, the set of tear seams release prior to the single tear seam, and the inflatable vehicle occupant protection device expands to the left and the right of the vehicle occupant. The single tear seam releases subsequent to the set of tear seams, and the inflatable vehicle occupant protection device then fully inflates.

A cover that would help the inflatable vehicle occupant protection device to reposition a vehicle occupant, under certain conditions during deployment, could reduce the forces to which the occupant is exposed.

SUMMARY OF THE INVENTION

In accordance with the present invention, an apparatus for helping to protect a vehicle occupant includes an inflatable vehicle occupant protection device, an inflator, and a cover for the inflatable vehicle occupant protection device. The inflator provides inflation fluid to inflate the inflatable vehicle occupant protection device. The cover has a front wall positioned between the vehicle occupant and the inflatable vehicle occupant protection device. The front wall includes a center section interposed between a first side section of the front wall and a second side section of the front wall.

The cover has at least one strong tear seam and at least one weak tear seam. The weak tear seam releases when subjected to a first force by the inflatable vehicle occupant protection device. The strong tear seam thereafter releases. The inflatable vehicle occupant protection device, while being inflated and releasing the weak tear seam, moves at least one of the side sections away from the center section. The inflatable vehicle occupant protection device deploys through a first area that is provided by moving the at least one side section. The inflatable vehicle occupant protection device, while deploying, urges a vehicle occupant away from the front wall. Thereafter, the strong tear seam releases, and the center section of the front wall moves away from the first area. The inflatable vehicle occupant protection device then deploys through a second area that is provided by moving the center section and becomes fully inflated.

The present invention also involves a method for helping to protect a vehicle occupant. The method comprises providing an inflatable vehicle occupant protection device and an inflator for providing inflation fluid to inflate the vehicle occupant protection device. The vehicle occupant protection device is covered with a cover having a front wall. The front wall is positioned between the vehicle occupant and the inflatable vehicle occupant protection device. The front wall includes a center section interposed between a first side section of said cover and a second side section of said cover. The cover has at least one strong tear seam and at least one weak tear seam.

The method includes releasing the at least one weak tear seam by subjecting the at least one weak tear seam to a first force by the inflatable vehicle occupant protection device, and thereafter releasing the at least one strong tear seam. In the method, the inflatable vehicle occupant protection device, while being inflated, releases the at least one weak tear seam and moves at least one of said side sections away from the center section. The inflatable vehicle occupant protection device deploys through a first area that is provided by moving the at least one side section. The inflatable vehicle occupant protection device urges a vehicle occupant away from the center section. Thereafter, the at least one strong tear seam releases, and the center section is moved away from the first area. The inflatable vehicle occupant protection device then deploys through a second area that is provided by moving the center section and becomes fully inflated.

BRIEF DESCRIPTION OF THE DRAWINGS

The foregoing and other features of the present invention will become apparent to those skilled in the art to which the present invention relates upon reading the following description of the invention with reference to the accompanying drawings, in which:

FIG. 7 is a schematic sectional view of the part of the apparatus of FIG. 4 embodying a fourth embodiment of the present invention;

FIG. 8 is a schematic sectional view of the part of the apparatus of FIG. 4 embodying a fifth embodiment of the present invention; and FIG. 9 is a schematic sectional view of the part of the apparatus of FIG. 4 embodying a sixth embodiment of the present invention.

DESCRIPTION OF A PREFERRED EMBODIMENT

Figure 1:
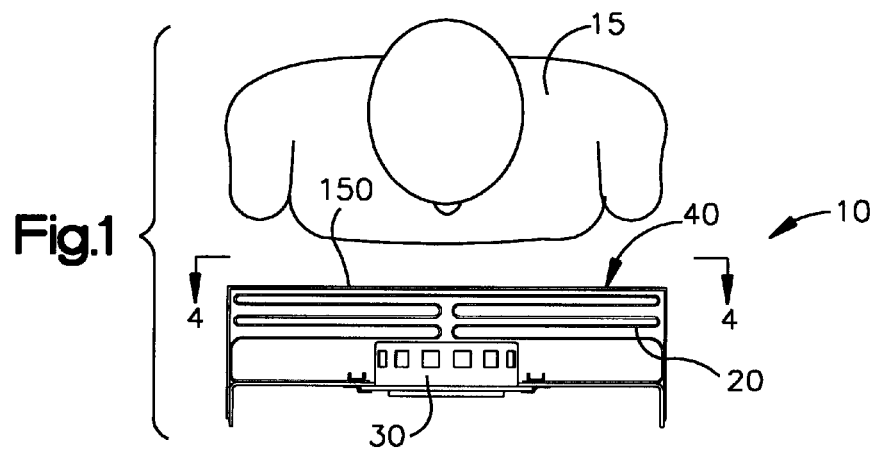
FIG. 1 is a schematic view of an apparatus embodying the present invention.

As representative of the present invention, FIG. 1 illustrates an apparatus 10 for helping to protect a vehicle occupant 15. The apparatus 10 includes an inflatable vehicle occupant protection device 20 (i.e., an air bag), an inflator 30, and a cover 40 for the vehicle occupant protection device 20. The inflator 30 provides inflation fluid to inflate the vehicle occupant protection device 20. The cover 40, the vehicle occupant protection device 20, and the inflator 30 are secured to a support structure that is fixedly secured to a vehicle. The cover 40 may be part of a vehicle steering wheel or of a vehicle instrument panel. The cover may be a separate part that is mounted to an air bag module, which module is connected with the steering wheel or instrument panel.

A sensor (not shown) senses vehicle deceleration indicating a vehicle collision for which inflation of the inflatable vehicle occupant protection device 20 is desired. The sensor causes a signal to be transmitted to the inflator 30 to actuate the inflator. The inflator 30, when actuated, directs inflation fluid into the inflatable vehicle occupant protection device 20 to inflate the vehicle occupant protection device.

Figure 4:
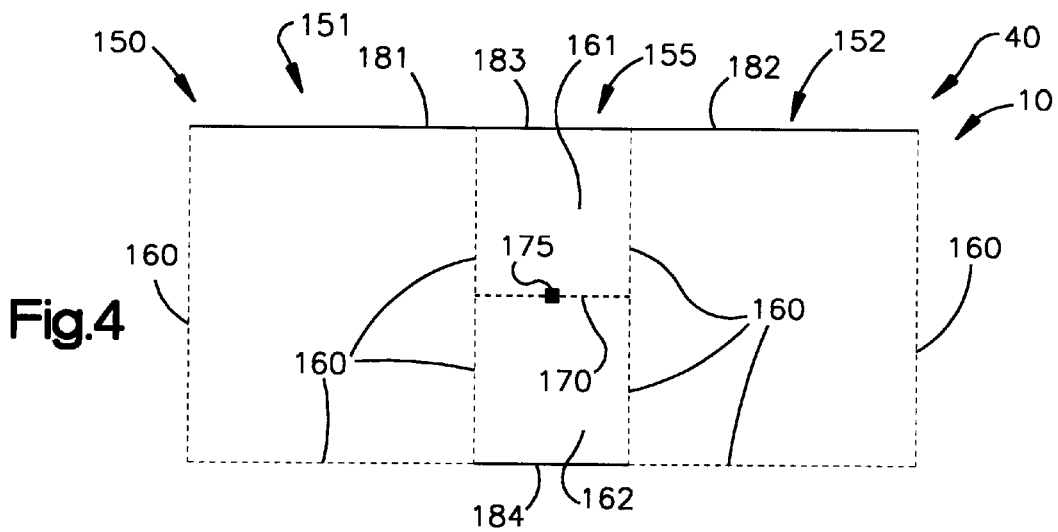
FIG. 4 is a schematic sectional view of part of the apparatus of FIG. 1 taken along line 4—4 in FIG. 1.

As viewed in FIGS. 1 & 4, the cover 40 has a front wall 150 facing the vehicle occupant 15 and positioned between the vehicle occupant 15 and the inflatable vehicle occupant protection device 20. The inflatable vehicle occupant protection device 20 deploys entirely through an area defined by the front wall 150. The front wall 150 includes a center section 155, a first side section 151, and a second side section 152. The side sections 151, 152 are the same size, and the center section is interposed between the side sections 151, 152.

The cover 40 has a linear strong tear seam 170 and linear weak tear seams 160. The weak tear seams 160 release when subjected to a first force by the inflatable vehicle occupant protection device 20. The strong tear seam 170 releases when subjected to a second force by the inflatable vehicle occupant protection device 20. The second force is larger than the first force.

The inflatable vehicle occupant protection device 20, while being inflated, releases the weak tear seams 160, and moves both of the side sections 151, 152 away from the center section 155. The inflatable vehicle occupant protection device 20 deploys through a first area that is provided by moving the side sections 151, 152.

Figure 2:
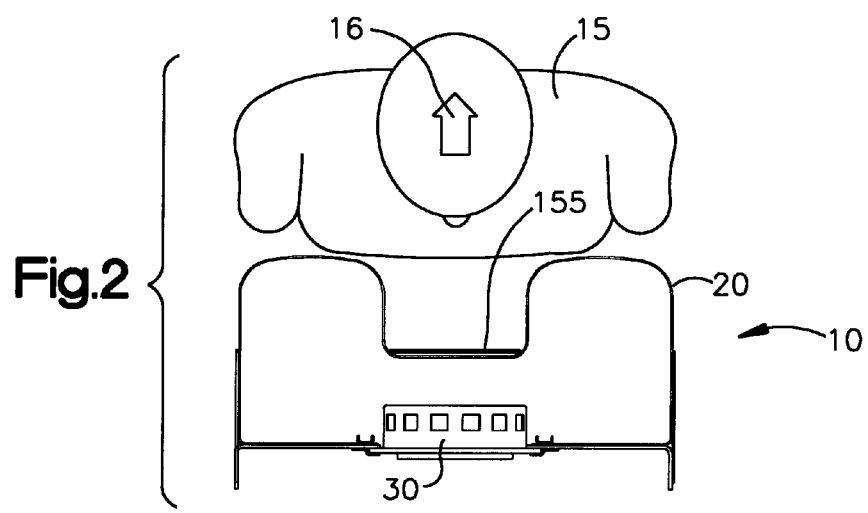
FIG. 2 is a schematic view of the apparatus of FIG. 1 illustrating an operating condition of the apparatus.

As viewed in FIG. 2, the inflatable vehicle occupant protection device 20, as it is inflating, urges a vehicle occupant 15 away from the inflator 30 and the center section 155. This urging is caused by the device 20 to occupant 15 interaction which occurs at opposite sides of the torso of the occupant. Thereafter, the inflatable vehicle occupant protection device 20 releases the strong tear seam 170 and moves the center section 155 away from the inflator 30 and the first area. As viewed in FIG. 3, the inflatable vehicle occupant protection device 20 deploys through a second area that is provided by moving the center section 155 and becomes fully inflated toward the vehicle occupant 15 to help protect the vehicle occupant.

Figure 3:
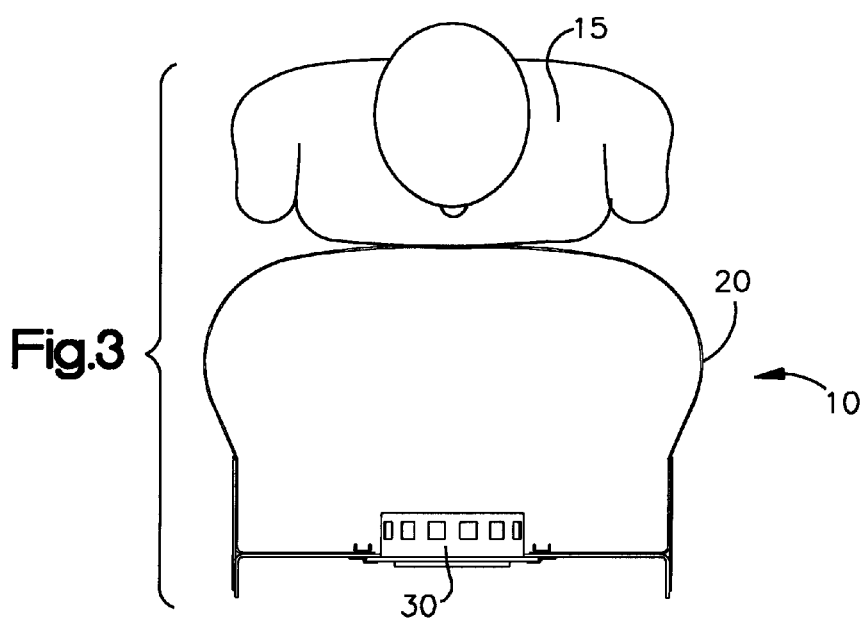
FIG. 3 is a schematic view of the apparatus of FIG. 2 illustrating a different operating condition of the apparatus.

The releasing of the weak tear seams 160 and the releasing of the strong tear seam 170, illustrated in FIGS. 2 and 3, respectively, typically occur within milliseconds of each other. The initial deployment of the inflatable vehicle occupant protection device 20 through the area provided by movement of side sections 151, 152 may also lessen the interaction (time-force history) between the inflatable vehicle occupant protection device and the vehicle occupant 15. In particular, the interaction may be less than with a similar device that has a cover in which a front wall opens fully immediately on deployment of the inflatable vehicle occupant protection device.

As viewed particularly in FIG. 4, a rectangular front wall 150 of the cover 40, representative of one embodiment of the present invention, has the strong tear seam 170 located in a rectangular center section 155 of the front wall 150. The strong tear seam 170 divides the center section 155 into a rectangular first portion 161 and a rectangular second portion 162 equal in size to the first portion. Weak tear seams 160 are located about the perimeter of first and second rectangular side sections 151, 152 and between the center section 155 and the first and second side sections. The first side section 151 and the second side section 152 are pivotable about a first hinge 181 and a second hinge 182, respectively, when the weak tear seams 160 release. The first portion 161 of the center section 155 is pivotable about a third hinge 183 when the strong tear seam 170 ruptures. The second portion 162 of the center section 155 is pivotable about a fourth hinge 184 when the strong tear seam 170 releases.

The first, second, and third hinges 181, 182, 183 may constitute a collinear, single hinge that forms the entire upper edge (as viewed in FIG. 4) of the front wall 150. The fourth hinge 184 is located along a central part of the lower edge of the front wall 150 (as viewed in FIG. 4).

The hinges 181, 182, 183 allow movement of the first side section 151, the second side section 152, and the first portion 161 of the center section 155. The fourth hinge 184 allows movement of the second portion 162 of the center section 155. The hinges 181, 182, 183, the fourth hinge 184, and the strong tear seam 170 may be parallel to one another (as viewed in FIG. 4).

The first and second side sections 151, 152 are equal in area. The center section 155 comprises about one-half the area of the first side section 151 and also about one-half the area of the second side section 152. As a result, the center section 155 comprises about one-fifth the area of the front wall 150.

During a vehicle collision, as the inflatable vehicle occupant protection device 20 begins to inflate, the weak tear seams 160 are released by the force applied by the inflatable vehicle occupant protection device. The inflatable vehicle occupant protection device 20 moves the first and second side sections 151, 152 away from the front wall 150 as the first side section and the second side section pivot about the first and second hinges 181, 182, respectively. Because the center section 155 remains in place, the inflatable vehicle occupant protection device 20 initially deploys through a first area vacated by the first and second side sections 151, 152.

As viewed in FIG. 2, the inflatable vehicle occupant protection device 20 deploys toward the sides of the vehicle occupant 15 and around the center section 155 of the front wall 150. The inflatable vehicle occupant protection device 20 thereby urges the vehicle occupant 15 toward a position away from the apparatus 10 (as indicated by the arrow 16).

As only a portion of the inflatable occupant protection device 20 can inflate and deploy through the first area, the fluid pressure in the inflatable vehicle occupant protection device increases. The force applied by the inflatable vehicle occupant protection device to the center section 155 of the front wall 150 also increases. After the weak tear seams 160 release, the force applied by the inflatable vehicle occupant protection device 20 on the front wall 150 releases the strong tear seam 170. The inflatable vehicle occupant protection device 20 causes the first and second portions 161, 162 of the center section 155 to pivot away from the inflator 30 as the inflatable vehicle occupant protection device deploys through a second area vacated by the center section 155. The first and second portions 161, 162 of the center section 155 will pivot outward about the hinges 183, 184. The inflatable vehicle occupant protection device will then become fully inflated to help restrain movement of the vehicle occupant during a collision.

Figure 5:
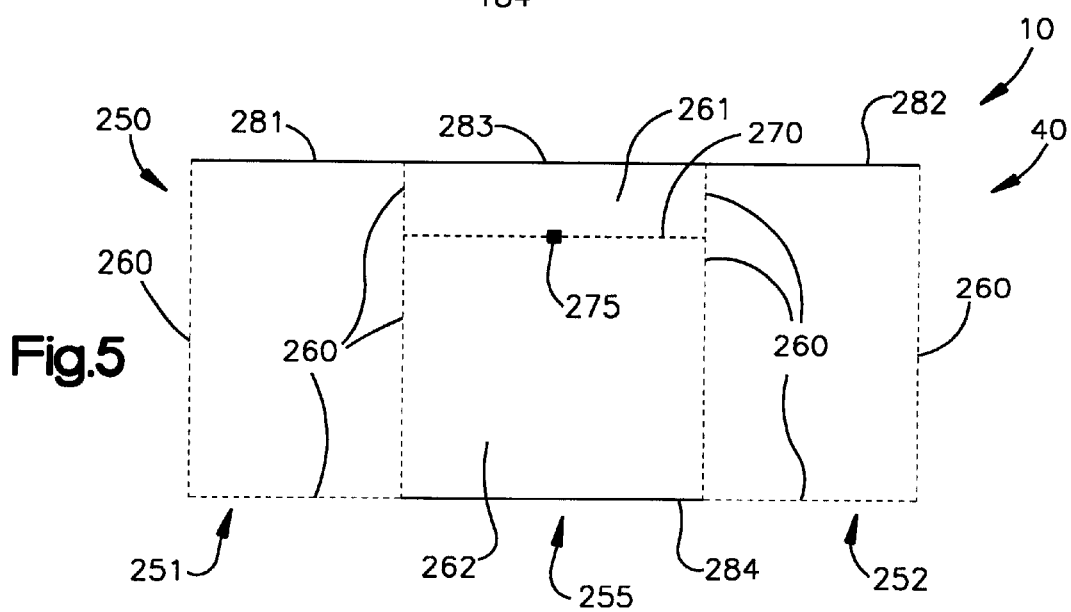
FIG. 5 is a schematic sectional view of the part of the apparatus of FIG. 4 embodying a second embodiment of the present invention.

As viewed in FIG. 5, a rectangular front wall 250 of the cover 40, representative of a second embodiment of the present invention, has a linear strong tear seam 270 located in a rectangular center section 255 of the front wall 250. The strong tear seam 270 separates the center section 255 into a rectangular upper or first portion 261 and a rectangular lower or second portion 262. The second portion 262 of the center section 255 is unequal in size (i.e., larger) as compared to the first portion 261. As shown in FIG. 5, the second portion 262 covers an area of the center section 255 that is at least twice that of an area of the center section covered by the first portion 261. Linear weak tear seams 260 are located about the perimeter of first and second rectangular side sections 251, 252 and between the center section 255 and the first and second side sections. The first side section 251 and the second side section 252 are pivotable about a first hinge 281 and a second hinge 282, respectively, when the weak tear seams 260 release. The first portion 261 of the center section 255 is pivotable about a third hinge 283 when the strong tear seam 270 releases. The second portion 262 of the center section 255 is pivotable about a fourth hinge 284 when the strong tear seam 270 releases.

The first, second, and third hinges 281, 282, 283 may constitute a collinear, single hinge that forms the entire upper edge (as viewed in FIG. 5) of the front wall 250. The fourth hinge 284 is located along a central part of the lower edge of the front wall 250 (as viewed in FIG. 5).

The hinges 281, 282, 283 allow pivotal movement of the first side section 251, the second side section 252, and the first portion 261 of the center section 255. The fourth hinge 284 allows pivotal movement of the second portion 262 of the center section 255. The hinges 281, 282, 283, the fourth hinge 284, and the strong tear seam 270 may be parallel to one another (as viewed in FIG. 5).

The first and second side sections 251, 252 are equal in area. The center section 255 comprises about one and one-half times the area of the first side section 251 and also about one and one-half times the area of the second side section 252. As a result, the center section 255 comprises about three-sevenths the area of the front wall 250.

During a vehicle collision, as the inflatable vehicle occupant protection device 20 begins to inflate, the weak tear seams 260 are released by the force applied by the inflatable vehicle occupant protection device. The inflatable vehicle occupant protection device 20 moves the first and second side sections 251, 252 away from the front wall 250 as the first side section and the second side section pivot about the first and second hinges 281, 282, respectively. Because the center section 255 remains in place, the inflatable vehicle occupant protection device 20 initially deploys through a first area vacated by the first and second side sections 251, 252.

As viewed similarly in FIG. 2, the inflatable vehicle occupant protection device 20 deploys toward the sides of the vehicle occupant 15 and around the center section 255 of the front wall 250. The inflatable vehicle occupant protection device 20 thereby safely urges the vehicle occupant 15 toward a position away from the apparatus 10.

As only a portion of the inflatable vehicle occupant protection device 20 can inflate and deploy through the first area, the fluid pressure in the inflatable vehicle occupant protection device 20 increases. The force applied by the inflatable vehicle occupant protection device to the center section 255 of the front wall 250 also increases. After the weak tear seams 260 release, the force applied by the inflatable vehicle occupant protection device 20 on the front wall 250 releases the strong tear seam 270. The inflatable vehicle occupant protection device 20 causes the first and second portions 261, 262 of the center section 255 to pivot toward the vehicle occupant 15 and away from the inflator 30 as the inflatable vehicle occupant protection device deploys through a second area vacated by the center section 255. Since the vehicle occupant 15 is positioned away from the inflator 30, the first and second portions 261, 262 of the center section 255 will pivot outward about the hinges 283, 284 without contacting the vehicle occupant.

Figure 6:
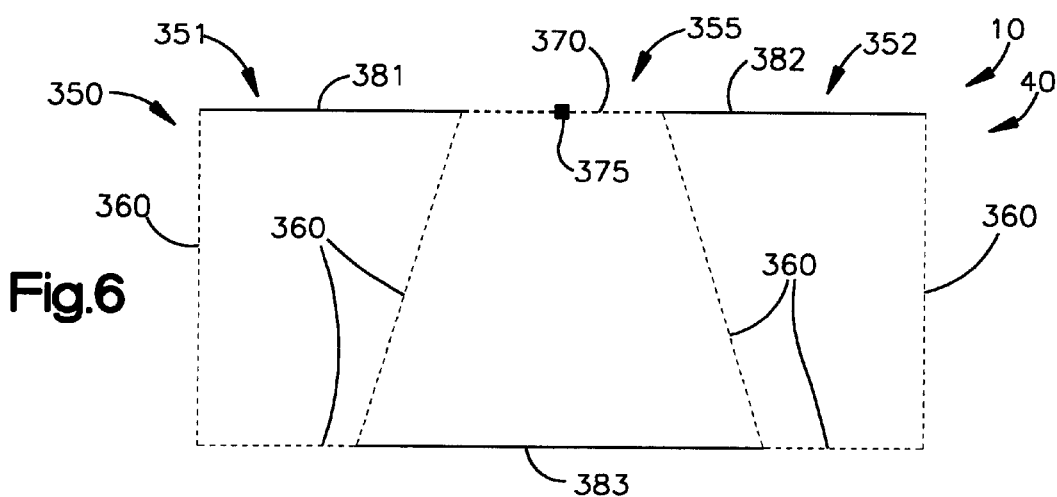
FIG. 6 is a schematic sectional view of the part of the apparatus of FIG. 4 embodying a third embodiment of the present invention.

As viewed in FIG. 6, a rectangular front wall 350 of the cover 40, representative of a third embodiment of the present invention, has a linear strong tear seam 370 located in a trapezoidal center section 355 of the front wall 350. The center section 355 is shaped as an equiangular trapezoid with only two parallel side edges. The strong tear seam 370 is located on the shorter, upper side edge of the center section 355. Linear weak tear seams 360 are located about the perimeter of first and second trapezoidal side sections 351, 352 and between the center section 355 and the first and second side sections. The first and second side sections 351, 352 each have only two parallel side edges. The first side section 351 and the second side section 352 are pivotable about a first hinge 381 and a second hinge 382, respectively, when the weak tear seams 360 release. The first and second hinges 381, 382 and the strong tear seam 370 are collinear and together form the entire upper edge of the front wall 350. The center section 355 is pivotable about a third hinge 383 when the strong tear seam 370 releases. The third hinge 383 is located along a central part of the lower edge of the front wall 350 (as viewed in FIG. 6).

The first hinge 381 allows pivotal movement of the first side section 351. The second hinge 382 allows pivotal movement of the second side section 352. The third hinge 383 allows pivotal movement of the center section 355. The line formed by the first hinge 381, the second hinge 382, and the strong tear seam 370 is parallel to the third hinge 383 (as viewed in FIG. 6).

The first and second side sections 351, 352 are equal in area. The center section 355 comprises about one and one-half times the area of the first side section 351 and also about one and one-half times the area of the second side section 352. As a result, the center section 355 comprises about three-sevenths the area of the front wall 350.

During a vehicle collision, as the inflatable vehicle occupant protection device 20 begins to inflate, the weak tear seams 360 are released by the force applied by the inflatable vehicle occupant protection device 20. The inflatable vehicle occupant protection device 20 moves the first and second side sections 351, 352 away from the front wall 350 as the first and second side sections pivot about the first and second hinges 381, 382, respectively. Because the center section 355 remains in place, the inflatable vehicle occupant protection device 20 initially deploys through a first area vacated by the first and second side sections 351, 352.

As viewed similarly in FIG. 2, the inflatable vehicle occupant protection device 20 deploys toward the sides of the vehicle occupant 15 and around the center section 355 of the front wall 350. The inflatable vehicle occupant protection device 20 thereby urges the vehicle occupant 15 toward a position away from the apparatus 10.

As only a portion of the inflatable occupant protection device 20 can inflate and deploy through the first area, the fluid pressure in the inflatable vehicle occupant protection device increases. The force applied by the inflatable vehicle occupant protection device 20 to the center section 355 of the front wall 350 also increases. After the weak tear seams 360 release, the force applied by the inflatable vehicle occupant protection device 20 on the front wall 350 releases the strong tear seam 370. The inflatable vehicle occupant protection device 20 causes the center section 355 to pivot toward the properly positioned vehicle occupant 15 and away from the inflator 30 as the inflatable vehicle occupant protection device deploys through a second area vacated by the center section 355. The center section 355 will pivot outward about the third hinge 383 without contacting the vehicle occupant.

As viewed in FIG. 7, a rectangular front wall 450 of the cover 40, representative of a fourth embodiment of the present invention, has a linear strong tear seam 470 defining an edge of a trapezoidal center section 455 of the front wall 450. The center section 455 is shaped as an equiangular trapezoid with only two parallel side edges. The strong tear seam 470 is located on the shorter, upper (as viewed in FIG. 7) side edge of the center section 455. Linear weak tear seams 460 are located about the perimeter of first and second trapezoidal side sections 451, 452 and between the center section 455 and the first and second side sections. The first and second side sections 451, 452 each have only two parallel side edges. The first side section 451 and the second side section 452 are pivotable about a first hinge 481 and a second hinge 482, respectively, when the weak tear seams 460 release. The center section 455 is pivotable about a third hinge 483 when the strong tear seam 470 releases. The third hinge 483 is located along a central part of the lower edge of the front wall 450. The first, second, and third hinges 481, 482, 483 are collinear and together constitute the entire lower edge of the front wall 450 and form a single hinge (as viewed in FIG. 7).

The first hinge 481 allows pivotal movement of the first side section 451. The second hinge 482 allows pivotal movement of the second side section 452. The third hinge 483 allows pivotal movement of the center section 455. The line formed by the first hinge 481, the second hinge 482, and the third hinge 483 is parallel to the strong tear seam 470 (as viewed in FIG. 7).

The first and second side sections 451, 452 are equal in area. The center section 455 comprises about one and one-half times the area of the first side section 451 and also about one and one-half times the area of the second side section 452. As a result, the center section 455 comprises about three-sevenths of the area of the front wall 450.

During a vehicle collision, as the inflatable vehicle occupant protection device 20 begins to inflate, the weak tear seams 460 are released by the force applied by the inflatable vehicle occupant protection device 20. The inflatable vehicle occupant protection device 20 pivots the first and second side sections 451, 452 away from the front wall 450 about the first and second hinges 481, 482, respectively. Because the center section 455 remains in place, the inflatable vehicle occupant protection device 20 initially deploys through a first area vacated by the first and second side sections 451, 452.

As viewed similarly in FIG. 2, the inflatable vehicle occupant protection device 20 deploys toward the sides of the vehicle occupant 15 and around the center section 455 of the front wall 450. The inflatable vehicle occupant protection device 20 thereby urges the vehicle occupant 15 toward a position away from the front wall 450.

As only a portion of the inflatable vehicle occupant protection device 20 can inflate and deploy through the first area, the fluid pressure in the vehicle occupant protection device increases. The force applied by the inflatable vehicle occupant protection device 20 to the center section 455 of the front wall 450 also increases. After the weak tear seams 460 release, the force applied by the inflatable vehicle occupant protection device 20 on the front wall 450 releases the strong tear seam 470. The inflatable vehicle occupant protection device 20 causes the center section 455 to pivot away from the inflator 30 as the inflatable vehicle occupant protection device deploys through a second area vacated by the center section 455. The center section 455 will move outward without contacting the vehicle occupant.

As viewed in FIG. 8, a rectangular front wall 550 of the cover 40, representative of a fifth embodiment of the present invention, has a linear strong tear seam 570 located in a trapezoidal center section 555 of the front wall 550. The center section 555 is shaped as an equiangular trapezoid with only two parallel side edges. The strong tear seam 570 is located on the shorter, upper side edge of the center section 555. Linear weak tear seams 560 are located about the perimeter of first and second trapezoidal side sections 551, 552 and between the center section 555 and the first and second side sections. The first and second side sections 551, 552 each have only two parallel side edges. The first side section 551 and the second side section 552 are pivotable about a first hinge 581 and a second hinge 582, respectively, when the weak tear seams 560 release. The center section 555 is pivotable about a third hinge 583. The third hinge 583 is located along a central part of the lower (as viewed in FIG. 8) edge of the front wall 550. The first hinge 581, the second hinge 582, and strong tear seam 570 are collinear and together form the entire upper edge of the front wall 550 (as viewed in FIG. 8).

The first hinge 581 allows pivotal movement of the first side section 551. The second hinge 582 allows pivotal movement of the second side section 552. The third hinge 583 allows pivotal movement of the center section 555. The line formed by the first hinge 581, the second hinge 582, and the strong tear seam 570 is parallel to the third hinge 583 (as viewed in FIG. 8).

The first and second side sections 551, 552 are equal in area. The center section 555 comprises about one-half the area of the first side section 551 and also about one-half the area of the second side section 552. As a result, the center section 555 comprises about one-fifth the area of the front wall 550.

During a vehicle collision, as the inflatable vehicle occupant protection device 20 begins to inflate, the weak tear seams 560 are released by the force applied by the inflatable vehicle occupant protection device 20. The inflatable vehicle occupant protection device 20 moves the first and second side sections 551, 552 away from the front wall 550 as the first and second side sections pivot about the first and second hinges 581, 582, respectively. Because the center section 555 remains in place, the inflatable vehicle occupant protection device 20 initially deploys through a first area vacated by the first and second side sections 551, 552.

As viewed similarly in FIG. 2, the inflatable vehicle occupant protection device 20 deploys toward a vehicle occupant 15 and around the center section 555 of the front wall 550. The inflatable vehicle occupant protection device 20 thereby urges the vehicle occupant 15 toward a position away from the front wall 550.

As only a portion of the inflatable vehicle occupant protection device 20 can inflate and deploy through the first area, the fluid pressure in the device increases. The force applied by the inflatable vehicle occupant protection device 20 to the center section 555 of the front wall 550 also increases. After the weak tear seams 560 release, the force applied by the inflatable vehicle occupant protection device 20 on the front wall 550 releases the strong tear seam 570. The inflatable vehicle occupant protection device 20 causes the center section 555 to pivot toward the vehicle occupant 15 and away from the inflator 30 as the inflatable vehicle occupant protection device deploys through a second area vacated by the center section 555. The center section 555 will move outward without contacting the vehicle occupant.

As viewed in FIG. 9, a rectangular front wall 650 of the cover 40, representative of a sixth embodiment of the present invention, has a linear strong tear seam 670 located in a trapezoidal center section 655 of the front wall 650. The center section 650 is shaped as an equiangular trapezoid with only two parallel side edges. The strong tear seam 670 is located on the shorter, upper (as viewed in FIG. 9) side edge of the center section 655. Linear weak tear seams 660 are located about the perimeter of first and second trapezoidal side sections 651, 652 and between the center section 655 and the first and second side sections. The first and second side sections 651, 652 each have only two parallel side edges. The first side section 651 and the second side section 652 are pivotable about a first hinge 681 and a second hinge 682, respectively, when the weak tear seams 660 release. The first and second hinges 681, 682 are parallel to each other. The center section 655 is pivotable about a third hinge 683. The third hinge 683 is located along a central part of the lower edge of the front wall 650. The first and second hinges 681, 682 are both perpendicular to the third hinge 683 and located at opposite side edges of the front wall 650 (as viewed in FIG. 9).

The first hinge 681 allows pivotal movement of the first side section 651. The second hinge 682 allows pivotal movement of the second side section 652. The third hinge 683 allows pivotal movement of the center section 655. The third hinge 683 is parallel to the strong tear seam 670 (as viewed in FIG. 9).

The first and second side sections 651, 652 are equal in area. The center section 655 comprises about one and one-half times the area of the first side section 651 and also about one and one-half times the area of the second side section 652. As a result, the center section 655 comprises about three-sevenths of the area of the front wall 650.

During a vehicle collision, as the inflatable vehicle occupant protection device 20 begins to inflate, the weak tear seams 660 are released by the force applied by the inflatable vehicle occupant protection device. The inflatable vehicle occupant protection device 20 pivots the first and second side sections 651, 652 away from the front wall 650 about the vertical axes (as viewed in FIG. 9) that are the first and second hinges 681, 682, respectively. Because the center section 655 remains in place, the inflatable vehicle occupant protection device 20 initially deploys through a first area vacated by the first and second side sections 651, 652.

As viewed similarly in FIG. 2, the inflatable vehicle occupant protection device 20 deploys toward the sides of the vehicle occupant 15 and around the center section 655 of the front wall 650. The inflatable vehicle occupant protection device 20 thereby urges the vehicle occupant 15 toward a position away from the apparatus 10.

As only a portion of the inflatable vehicle occupant protection device 20 can inflate and deploy through the first area, the fluid pressure in the device increases. The force applied by the inflatable vehicle occupant protection device 20 to the center section 655 of the front wall 650 also increases. After the weak tear seams 660 release, the force applied by the inflatable vehicle occupant protection device 20 on the front wall 650 releases the strong tear seam 670. The inflatable vehicle occupant protection device 20 causes the center section 655 to pivot toward the vehicle occupant 15 and away from the inflator 30 as the inflatable vehicle occupant protection device deploys through a second area vacated by the center section 655. The center section 655 will move outward without contacting the vehicle occupant.

A method representative of the present invention includes the steps of: sensing the occurrence of a vehicle collision whereupon it is desired to deploy an inflatable vehicle occupant protection device 20; partially deploying the inflatable vehicle occupant protection device 20 to urge a vehicle occupant 15 away from an actuated inflator 30, the partially deploying step including the step of deploying the inflatable vehicle occupant protection device 20 to at least one side of the vehicle occupant 15; and thereafter, fully deploying the inflatable vehicle occupant protection device 20, thereby helping to protect the vehicle occupant 15.

The method may further include the steps of: releasing weak tear seams 160 prior to the partially deploying step; and releasing a strong tear seam 170 prior to the fully deploying step. The method may still further include the steps of: moving one or both side sections 151, 152 of a front wall 150 of a cover 40 away from a center section 155 of the front wall of the cover; and thereafter moving the center section 155 of the front wall 150 toward the vehicle occupant 15.

The method may further yet include the steps of: pivoting one or both side sections 151, 152 of the front wall 150 of the cover 40 about a hinge 181 or 182; and thereafter pivoting the center section 155 of the front wall 150 about another hinge 183 or 184.

With regard to all of the embodiments, the thickness of the cover material defining the weak tear seams is typically about one-fourth (¼) the thickness of the cover material defining the strong tear seams. Also, with regard to all of the embodiments, the cover 40 is illustrated as rectangular in shape. However, the cover 40 may be any shape.

The strong tear seam may be released by a known passive or active actuator device indicated schematically at 175, 275, 375, 473, 575, and 675), instead of the inflatable vehicle occupant protection device 20 for facilitating control of movement of the center section of the respective covers. The device may be a magnetic release mechanism, a pyro-bolt, a pyro-rivet, a pyro-cutter, a solenoid, a pyro-cord, or the like that functions at a time delay after actuation of the inflator 30.

The weak tear seams may also be released by known passive or active actuator devices (not shown). When the actuator devices are utilized to release the weak tear seams and the strong tear seam, the thickness of all the tear seams may be the same. The actuator devices, not the thicknesses, determine the releasing sequence of the strong tear seam compared to the weak tear seams.

From the above description of the invention, those skilled in the art will perceive improvements, changes and modifications. For example, the tear seams and hinges may be non-linear instead of linear. The tear seams could be any shape as long as they define areas such as depicted in the disclosed embodiments or equivalent areas. Such improvements, changes and modifications within the skill of the art are intended to be covered by the appended claims.

Having described the invention, the following is claimed:

1. An apparatus for helping to protect a vehicle occupant comprising:

an inflatable vehicle occupant protection device;

an inflator for providing inflation fluid to inflate said vehicle occupant protection device; and a cover for said inflatable vehicle occupant protection device, said cover having a front wall positioned between the vehicle occupant and said inflatable vehicle occupant protection device, said front wall including a center section interposed between a first side section of said cover and a second side section of said cover, said cover having at least one strong tear seam and at least one weak tear seam, said at least one weak tear seam releasing when subjected to a first force by said inflatable vehicle occupant protection device, said at least one strong tear seam releasing after releasing of said at least one weak tear seam, said at least one strong tear seam dividing said center section into an upper portion and a lower portion, said lower portion covering an area of said center section that is at least twice an area of said center section covered by said upper portion, said inflatable vehicle occupant protection device, while being inflated, releasing said at least one weak tear seam and moving said side sections away from said center section, said inflatable vehicle occupant protection device having first and second spaced apart lateral portions deploying through a first area provided by moving said side sections, and said first and second spaced apart lateral portions engaging the vehicle occupant to move the vehicle occupant away from said center section, thereafter, said at least one strong tear seam releasing and said inflatable vehicle occupant protection device moving said upper portion upward and away from said first area and said lower portion downward and away from said first area, said inflatable vehicle occupant protection device then having a central portion deploying through a second area provided by moving said center section and becoming fully inflated.

2. The apparatus as defined in claim 1 wherein said strong tear seam is released when subjected to a second force by said inflatable vehicle occupant protection device, said second force being greater than said first force.

3. The apparatus as defined in claim 1 wherein said first and second spaced apart lateral portions deploy through said first area and at least partially around said center section while engaging the occupant and moving the occupant away from said center section.

4. The apparatus as defined by claim 1 wherein said cover has at least two weak tear seams partially defining said first and second side sections, said first and second spaced apart lateral portions moving both said first side section and said second side section away from said center section such that said first and second spaced apart lateral portions inflate around said center section when said at least two weak tear seams release.

5. The apparatus as defined in claim 1 wherein said inflatable vehicle occupant protection device deploys entirely through an area defined by said front wall of said cover.

6. The apparatus as defined in claim 1 wherein said first side section has only two parallel side edges.

7. The apparatus as defined in claim 6 wherein said second side section has only two parallel side edges.

8. The apparatus as defined in claim 6 wherein said center section has only two parallel side edges.

9. The apparatus as defined in claim 1 wherein said front wall of said cover includes a first hinge for allowing pivotal movement of said first side section, a second hinge for allowing pivotal movement of said second side section, and a third hinge for allowing pivotal movement of said center section.

10. The apparatus as defined in claim 9 wherein said first and second hinges are collinear.

11. The apparatus as defined in claim 9 wherein said first and second hinges are both parallel to said third hinge.

12. The apparatus as defined in claim 9 wherein said front wall of said cover further includes a fourth hinge for allowing pivotal movement of part of said center section.

13. The apparatus as defined in claim 12 wherein said third and fourth hinges are both parallel to said strong tear seam.

14. The apparatus as defined in claim 1 wherein said front wall of said cover includes a continuous hinge for allowing pivotal movement of said first side section, said second side section, and at least a portion of said center section.

15. The apparatus as defined in claim 14 wherein said continuous hinge extends across an entire edge of said front wall of said cover.

16. The apparatus as defined in claim 1 wherein an area covered by said center section is about one and one-half times an area covered by said first side section.

17. The apparatus as defined in claim 16 wherein said area covered by said center section is about one and one-half times an area covered by said second side section.

18. An apparatus for helping to protect a vehicle occupant comprising:

an inflatable vehicle occupant protection device;

an inflator for providing inflation fluid to inflate said vehicle occupant protection device; and a cover for said inflatable vehicle occupant protection device, said cover having a front wall positioned between the vehicle occupant and said inflatable vehicle occupant protection device, said front wall including a center section interposed between a first side section of said cover and a second side section of said cover, said cover having at least one strong tear seam and at least one weak tear seam, said at least one weak tear seam releasing when subjected to a first force by said inflatable vehicle occupant protection device, said at least one strong tear seam releasing after releasing of said at least one weak tear seam, said cover including a first hinge for allowing pivotal movement of said first side section, a second hinge for allowing pivotal movement of said second side section, and a third hinge for allowing pivotal movement of said center section, said strong tear seam being collinear with both said first and second hinges;

said inflatable vehicle occupant protection device, while being inflated, releasing said at least one weak tear seam and moving said side sections away from said center section, said inflatable vehicle occupant protection device having first and second spaced apart lateral portions deploying through a first area provided by moving said side sections, and said first and second spaced apart lateral portions engaging the vehicle occupant to move the vehicle occupant away from said center section, thereafter, said at least one strong tear seam releasing and said inflatable vehicle occupant protection device moving said center section away from said first area, said inflatable vehicle occupant protection device then having a central portion deploying through a second area provided by moving said center section and becoming fully inflated.

19. An apparatus for helping to protect a vehicle occupant comprising:
   an inflatable vehicle occupant protection device;
   an inflator for providing inflation fluid to inflate said vehicle occupant protection device; and
   a cover for said inflatable vehicle occupant protection device, said cover having a front wall positioned between the vehicle occupant and said inflatable vehicle occupant protection device, said front wall including a center section interposed between a first side section of said cover and a second side section of said cover,
   said cover having at least one strong tear seam and at least one weak tear seam, said at least one weak tear seam releasing when subjected to a first force by said inflatable vehicle occupant protection device, said at least one strong tear seam releasing after releasing of said at least one weak tear seam,
   said inflatable vehicle occupant protection device, while being inflated, releasing said at least one weak tear seam and moving said side sections away from said center section, said inflatable vehicle occupant protection device having first and second spaced apart lateral portions deploying through a first area provided by moving said side sections, and said first and second spaced apart lateral portions engaging a vehicle occupant to move the vehicle occupant away from said center section,
   thereafter, said at least one strong tear seam releasing and said inflatable vehicle occupant protection device moving said center section away from said first area, said inflatable vehicle occupant protection device then having a central portion deploying through a second area provided by moving said center section and becoming fully inflated,
   said apparatus further including an actuator for releasing said strong tear seam.

20. An apparatus for helping to protect a vehicle occupant comprising:
   an inflatable vehicle occupant protection device;
   an inflator for providing inflation fluid to inflate said inflatable vehicle occupant protection device; and
   a cover for said inflatable vehicle occupant protection device, said cover having a front wall positioned between the vehicle occupant and said inflatable vehicle occupant protection device, said front wall including a center section interposed between a first side section of said front wall and a second side section of said front wall, said center section being shaped as a trapezoid,
   said inflatable vehicle occupant protection device having first and second spaced apart lateral portions which, while being inflated, move said side sections away from said center section, said first and second spaced apart lateral portions thereby deploying through a first area provided by moving said side sections, and said first and second spaced apart lateral portions engaging the vehicle occupant to move the vehicle occupant away from said center section,
   thereafter, said inflatable vehicle occupant protection device moving said center section away from said first area, said inflatable vehicle occupant protection device having a center portion, located between said first and second spaced apart lateral portions, which deploys through a second area provided by moving said center section.

21. The apparatus as defined in claim 20 wherein said first and second side sections are shaped as trapezoids.

22. The apparatus as defined in claim 20 wherein said cover has at least one strong tear seam and at least one weak tear seam, said at least one weak tear seam releasing when subjected to a first force by said first and second spaced apart lateral portions of said inflatable vehicle occupant protection device and deploying said first and second spaced apart lateral portions through said first area, said at least one strong tear seam releasing when subjected to a second force by said center portion of said inflatable vehicle occupant protection device and deploying said center portion through said second area, said second force being larger than said first force.

23. The apparatus as defined in claim 20 wherein said cover includes two parallel side hinges for allowing pivotal movement of said first and second side sections.

24. The apparatus as defined in claim 23 wherein said parallel side hinges are perpendicular to a central hinge, said central hinge allowing pivotal movement of at least a portion of said center section.

25. The apparatus as defined in claim 23 wherein said cover includes a center hinge for allowing pivotal movement of said center section, said center hinge being disposed perpendicular to said side hinges.

26. A method for helping to protect a vehicle occupant comprising:
   providing an inflatable vehicle occupant protection device and an inflator for inflating said vehicle occupant protection device;
   covering said inflatable vehicle occupant protection device with a cover having a front wall;
   positioning said front wall between the vehicle occupant and said inflatable vehicle occupant protection device, said front wall including a center section interposed between a first side section of said cover and a second side section of said cover, said cover having at least one strong tear seam and at least one weak tear seam;
   releasing said at least one weak tear seam by subjecting said at least one weak tear seam to a first force by said inflatable vehicle occupant protection device;
   releasing said at least one strong tear seam with an actuator after releasing said at least one weak tear seam;
   moving said side sections of said cover away from said center section of said cover using first and second spaced apart lateral portions of said inflatable vehicle occupant protection device, said first and second spaced part lateral portions deploying through a first area provided by moving said side sections, said first and second spaced apart lateral portions engaging the vehicle occupant to move the vehicle occupant away from said center section; and
   thereafter, moving said center section away from said first area using a center portion of said inflatable vehicle occupant protection device located between said first and second spaced apart lateral portions, said center portion then deploying through a second area provided by moving said center section and becoming fully inflated.

* * * * *